(12) United States Patent
Schmitz et al.

(10) Patent No.: US 6,892,695 B2
(45) Date of Patent: May 17, 2005

(54) COMBUSTION PROCESS WITH CHARGE STRATIFICATION FOR AN INTERNAL COMBUSTION ENGINE WITH DIRECT INJECTION AND SPARK IGNITION

(75) Inventors: Klaus Schmitz, Munich (DE); Stephan Rubbert, Munich (DE); Martin Berckmueller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/860,309

(22) Filed: Jun. 4, 2004

(65) Prior Publication Data

US 2004/0216715 A1 Nov. 4, 2004

Related U.S. Application Data

(63) Continuation of application No. PCT/EP02/12246, filed on Nov. 2, 2002.

(30) Foreign Application Priority Data

Dec. 5, 2001 (DE) .......................................... 101 59 644

(51) Int. Cl.$^7$ ............................................... F02B 17/00
(52) U.S. Cl. ....................... 123/295; 123/279; 123/301
(58) Field of Search ................................ 123/295, 305, 123/263, 276, 279, 290, 301

(56) References Cited

U.S. PATENT DOCUMENTS

| | | | | |
|---|---|---|---|---|
| 4,958,604 A | | 9/1990 | Hashimoto | ................... 123/276 |
| 5,020,485 A | * | 6/1991 | Watanabe | ................. 123/73 C |
| 6,173,690 B1 | | 1/2001 | Iriya et al. | ................... 123/295 |
| 6,311,665 B1 | * | 11/2001 | Yasuoka et al. | ............. 123/260 |
| 6,494,178 B1 | * | 12/2002 | Cleary et al. | ................ 123/276 |
| 6,651,611 B2 | * | 11/2003 | Lippert et al. | ............... 123/295 |
| 6,702,194 B2 | * | 3/2004 | Nakayama et al. | ........... 239/88 |
| 6,715,463 B2 | * | 4/2004 | Kudo et al. | .................. 123/261 |

FOREIGN PATENT DOCUMENTS

| | | |
|---|---|---|
| DE | 199 18 036 A1 | 10/1999 |
| EP | 0 879 943 A2 | 11/1998 |
| EP | 0 916 821 A2 | 5/1999 |
| EP | 1 094 208 A1 | 4/2001 |
| JP | 10-339145 | 12/1998 |

OTHER PUBLICATIONS

International Search Report—Feb. 28, 2003.

* cited by examiner

*Primary Examiner*—Mahmoud Gimie
(74) *Attorney, Agent, or Firm*—Crowell & Moring LLP

(57) ABSTRACT

In an internal combustion engine having direct injection and spark ignition, charging air is introduced in stratified charge operation through one of two valve-controlled intake channels into a cylinder having a roof-like cylinder head end and a piston having a piston head with a recess oriented toward the intake side. The charging air is introduced forms a swirl flow, into which fuel is introduced. To avoid fuel accumulation on the recess wall, a strong swirl flow with a compact swirl core is achieved through a flow-optimized filling channel, with the swirl core being held in a fixed position in a rotor recess at the latest in the second section of the stroke of the piston toward top dead center such that fuel introduced into the swirl core with a relatively late end of the injection is supplied to an ignition device due to the piston movement toward top dead center.

24 Claims, 1 Drawing Sheet

COMBUSTION PROCESS WITH CHARGE STRATIFICATION FOR AN INTERNAL COMBUSTION ENGINE WITH DIRECT INJECTION AND SPARK IGNITION

The present application is a continuation of International Patent Application No. PCT/EP02/12246, filed Nov. 2, 2002, designating the United States of America and published in German as WO 03/048540 A1, the entire disclosure of which is incorporated herein by reference. Priority is claimed based on Federal Republic of Germany Patent Application No. 101 59 644.8, filed Dec. 5, 2001.

BACKGROUND AND SUMMARY OF THE INVENTION

This invention relates to a combustion process having charge stratification for an internal combustion engine having direct injection and spark ignition. In stratified charge operation, charging air is introduced through one of two valve-controlled, optimized-flow intake channels into a cylinder of the internal combustion engine having a roof-like border on the cylinder head side, containing intake valves and at least one exhaust valve and a piston having a piston head adapted to the roof-like border with a recess oriented at the intake end to develop a predominantly swirl flow, with fuel being introduced from an injection nozzle into the swirl flow.

Unexamined German Patent DE 199 18 036 A1 discloses a generic combustion process. In this combustion process in stratified charge operation the charging air is introduced into the cylinder through an intake channel which functions as a filling channel to generate a swirl flow which is essentially concentrated in the rotor recess with the lifting movement of the piston in the direction of top dead center. This rotor recess, which is designed with a circular shape as seen from above, has a trough-like cross section with an extremely deepened circular section from which the trough increases relatively shallowly to the intake side and/or to the side of the injection nozzle, but is designed to rise relatively steeply in relation to the ignition device which is situated at the center relatively. This design pursues the goal of supplying fuel as a rich cloud of fuel to the ignition device, the fuel being introduced in the direction of the recessed section, into the swirl flow through the border of the trough, which rises relatively steeply.

With this known combustion process in stratified charge operation to prevent wall accumulation of the fuel in the rotor recess with the negative result of increased formation of HC and carbon black, accurate control of the fuel stream is required.

The object of this invention is to improve upon a generic combustion process such that a deep rotor recess is avoided in stratified charge operation as the essential device for developing a rich ignitable fuel-air mixture cloud.

This object is achieved with an internal combustion engine having direct injection and spark ignition, whereby in stratified charge operation charging air is introduced through one of two flow-optimized valve-controlled intake channels into a cylinder of the internal combustion engine having a roof-like border containing intake valves and at least one exhaust valve having a piston with a piston head adapted to the roof-like border with a recess oriented to the intake side to create a predominant swirl flow, in which fuel is introduced into the swirl flow from an injector nozzle. Due to the fact that the intake channel, which is operated as a filling channel, is operated essentially unthrottled in stratified charge operation, and this intake channel generates a swirl flow in the area of the rotor recess by means of a relatively steep arrangement of at least 20° in relation to the machine high center plane in the cylinder head, at least from the end of the injection at 60°–30° before the top dead center of the piston, with a tubular swirl core directed essentially in the direction of the cylinder axis and fixed in position in the rotor recess, which is designed to be essentially open on the intake end by means of a rotor recess edge which is up to 0.15 D high and is arranged on the exhaust end at a maximum distance from the center axis of the ignition device of 0.2 D of a cylinder, where D=60–100 mm, such that an ignitable mixture cloud that is compact essentially in the swirl core of the swirl flow is maintained in the area of the ignition device, while the piston continues to approach top dead center until ignition at 0°–35° after the respective end of the injection.

As experimental results have proven, a swirl flow having a tubular swirl core develops in a cylinder having a great charge filling, and this swirl core can be advantageously fixed in position according to this invention by means of a relatively low recess edge on a relatively shallow rotor recess starting at a stroke range of approx. 80° piston position before top dead center with respect to an ignition device arranged in the area of the cylinder axis. According to this invention, fuel is introduced in this swirl core by means of a fuel stream which is controllable as a function of load in its pulse, such that the fuel stream passes only slightly through the swirl core in the direction of the exhaust end. Thus with this invention a compact ignitable mixture cloud is achieved in the area of the ignition device with a reduced risk of wall accumulation on the rotor recess.

In a preferred embodiment of the combustion process according to this invention, fuel is discharged from an injection nozzle arranged beneath the intake channels with a stream axis inclined between 0°=orthogonal to the cylinder axis and 30° on the piston side, the stream axis being inclined downward in the direction of an ignition device that is provided in the area of the cylinder axis, with a pulse that is controllable as a function of load such that the essential part of a spray cone is introduced into the swirl core.

For implementing the combustion process according to this invention, a multihole nozzle or a swirl injector each having a stream cone angle of 40°–55° or 60°–80° or a throttle pin nozzle having a similar stream cone angle is used.

In conjunction with the position of the injection nozzle described above, these values yield the advantage that a section of the fuel tone strikes the ignition device in the swirl cone and thus ensures a reliable start of the combustion.

Using the aforementioned injection nozzles, the combustion process may also be designed so that fuel is discharged from an injection nozzle situated adjacent to the ignition device on the cylinder head end, with a pulse that is controllable as a function of the load, such that a spray cone which introduces the essential fuel component into the swirl core of the swirl flow ends at a predetermined distance from the rotor recess of the piston approaching top dead center.

Other objects, advantages and novel features of the present invention will become apparent from the following detailed description of the invention when considered in conjunction with the accompanying drawings.

DETAILED DESCRIPTION

Figure 1:
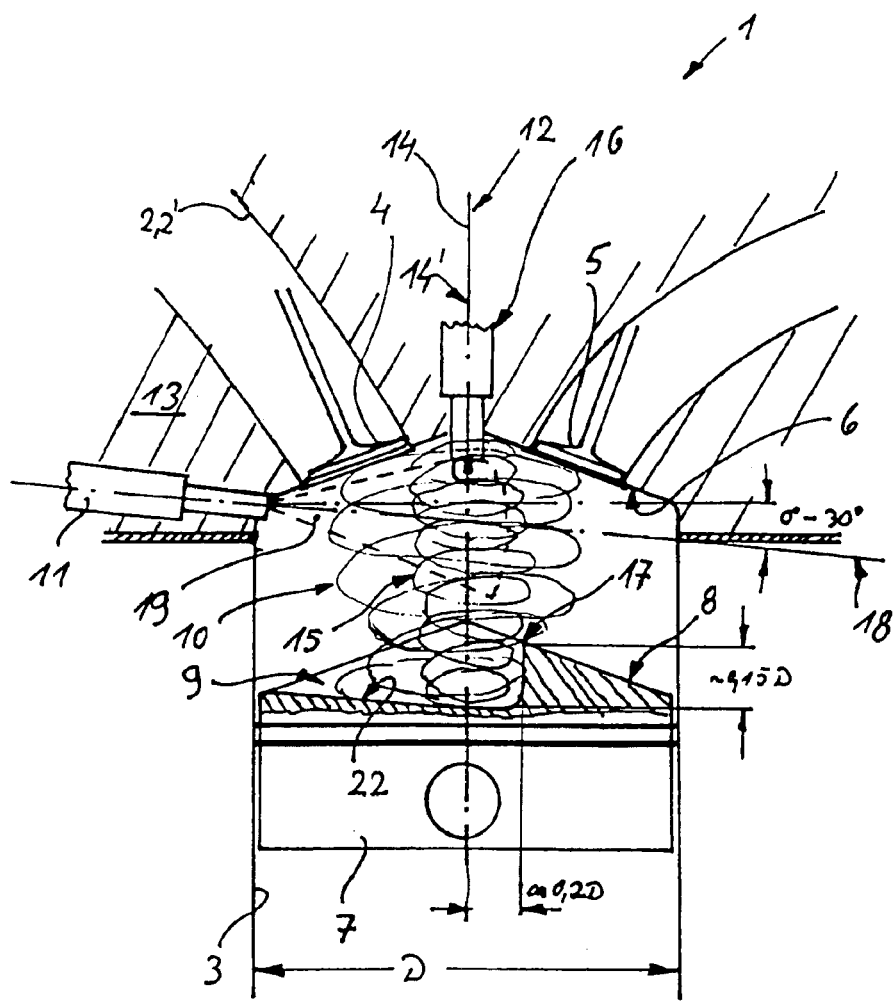
FIG. 1 is a schematic diagram of a combustion chamber cylinder having a piston in accordance with an embodiment of the present invention.

In a combustion process with charge stratification for an internal combustion engine 1 having direct injection and spark ignition, in stratified charge operation, charging air is introduced into a cylinder 3 of the internal combustion engine 1 through one of two flow-optimized valve-controlled intake channels 2, 2', with a roof-like border 6 on the cylinder head end containing intake valves 4 and at least one exhaust valve 5 and with a piston 7 having a piston head 8 adapted to the roof-like border 6 with a recess 9 oriented toward the intake side to create a mainly swirl flow 10. By means of an injector nozzle 11, fuel is introduced into the swirl flow 10.

To avoid the rotor recess 9 as an essential device for developing a rich ignitable fuel-air mixture cloud in stratified charge operation and thereby to prevent wall accumulation, which would have a negative effect, it is proposed according to this invention for the combustion process that the intake channel 2, which functions as a filling channel, be operated essentially unthrottled, at least in stratified charge operation, and that this intake channel 2 shall generate a swirl flow 10 in the area of the rotor recess 9, with a tubular swirl core 15 directed essentially in the direction of the cylinder axis 14 by means of a relatively steep arrangement (in relation to the machine high center plane 12) of at least 20° in the cylinder head 13 at least after the end of the injection at 60°–30° before top dead center of the piston. This swirl core 15 is fixed in position in the rotor recess 9 which is designed to be essentially open on the intake end by means of a rotor recess edge 17 which is up to 0.15 D high and is arranged a maximum of up to 0.2 D of a cylinder 3, where D=60–100 mm away from the center axis 14' of the ignition device 16 on the exhaust end, such that an ignitable mixture cloud which is formed essentially in the swirl core 15 of the swirl flow 10 is kept in the area of the ignition device 16 while the piston 7 continues to move to top dead center until ignition at 0°–35° after the respective end of injection. Thus in stratified charge operation, accumulation of fuel at the wall, which would have a negative effect with regard to the formation of HC and carbon black, is advantageously prevented.

In a first variant of the combustion process according to this invention, fuel from an injector nozzle 11 located beneath the intake channels 2, 2' is discharged in the direction of an ignition device 16, which is provided in the area of the cylinder axis 14, with a pulse that can be controlled as a function of load and with a fuel stream axis 18 which is included downward between 0°=orthogonal to the cylinder axis 14 and 30° on the piston side such that the essential part a spray cone 19 is introduced into the swirl core 15. In addition, with the selected position of the injector nozzle 11 according to this invention, a measure is taken to further reduce accumulation of fuel at the wall.

A multihole nozzle having a stream cone angle of the spray cone 19 of 40°–50° may be selected as the injector nozzle 11 or a swirl injector with a stream cone angle of the spray cone 19 of 60°–80° or a throttle pin nozzle may be selected.

Figure 2:
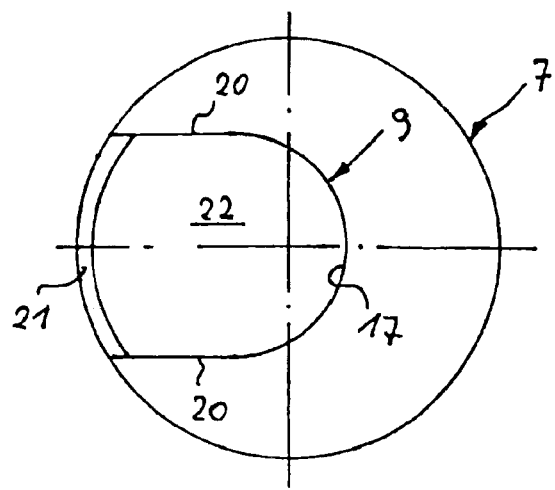
FIG. 2 is a top view of the piston of FIG. 1.

To keep the swirl core 15 of the swirl flow 10 which is captured in the rotor recess 9 in place in the area of the ignition device 16 as the piston 7 approaches the top dead center position, the edge 17 of the rotor recess 9 is designed with a curved shape—as seen from above in the view according to FIG. 2—with other recess borders 20 being connected to it in the direction of the piston edge 21 at an approximately parallel distance, whereby the rotor recess 9 which is open toward the piston head 21 has a recess bottom 22, which is designed to rise at least in sections up to the piston edge 21 and is connected via adapted fillet areas with radii of 5–20 mm with the recess borders 20 and the curved border 17. The design of the rotor recess 9 which is open on the intake end with the recess bottom 22 designed to rise slightly toward the piston edge 21 is another measure for avoiding wall accumulation of the fuel in injection.

In addition to the arrangement of the injector nozzle 11 described and shown on the basis of FIG. 1, it is possible in another variation of the inventive combustion process for fuel to be discharged from an injector nozzle arranged adjacent to the ignition device 16 on the cylinder head end with a pulse that is controllable as a function of load such that a spray cone introducing the essential part of the fuel into the swirl core 15 of the swirl flow 10 ends at a predetermined distance from the rotor recess 9 of the piston 7 approaching top dead center.

Each of the injector nozzles 11 is arranged in such a way that the spray cone 19 reaches the respective ignition device 16.

A design of the internal combustion engine which is advantageous for both of the injector nozzle arrangements described above for implementing the inventive combustion process provides for each of the flow-optimized intake channels 2, 2' to be designed as a filling channel, whereby the second filling channel can be switched off in the partial load range by means of an element which closes the channel cross section in a controlled manner—e.g., a valve or a valve cutoff.

These intake channels 2, 2' may be designed as filling channels which are separate from one another up to the intake valves 4. Another known measure consists of designing an intake channel which is common to two intake valves 4 with a corresponding cross section upstream from the intake channels 4, whereby one intake channel which can be cut off and/or has a reducible stroke is provided for each branch of the intake channel.

With the fixation of the swirl core 15 in the recess 9 at the latest after half the stroke distance of the piston 7 in the direction of top dead center according to this invention, fuel can be introduced into the swirl core 15 in stratified charge operation with a relatively late end of the injection to achieve an ignitable mixture cloud and the fuel can essentially be kept there until ignition by the ignition device 16, whereby with the charging air supplied largely in an unthrottled manner in stratified charge operation in partial load fuel added at the wall is also included in the combustion induced in addition to a stable swirl flow 10 with a powerful swirl core 15 and thus emission of HC and carbon black is minimized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Combustion process with charge stratification for an internal combustion engine having direct injection and spark ignition, the engine having a cylinder, the cylinder having a roof-like border on a cylinder head end containing intake valves and at least one exhaust valve, and a piston, the piston having a piston head adapted to the roof-like border with a recess oriented to a side of the cylinder containing at least one of the intake valves, comprising the steps of:

introducing charging air during a stratified charge operation through one of at least two intake valve-controlled intake channels into the cylinder to create a swirl flow the vicinity of the recess;

introducing fuel into the swirl flow from an injector nozzle; and igniting the fuel with an ignition device located at a top center of the roof-like border, wherein the recess is essentially open at an intake side and has a recess border on a side opposite the intake side of up to 0.15 D high and up to 0.2 D from the center axis of the ignition device, where D is a cylinder diameter, the intake valve controlling the intake channel through which charging air is introduced is operated essentially unthrottled at least in stratified charge operation, and an injector nozzle located between the intake channels and a top of a cylinder wall delivers fuel in a spray cone in the direction of the ignition device, the spray cone having a stream axis inclined 0 and 30 degrees downward from a plane orthogonal to the cylinder axis, the injector nozzle being controllable as a function of load such that a substantial portion of the spray cone is introduced into the swirl core, such that a tubular swirl core aligned with a center axis of the ignition device is formed from the swirl flow by the recess by the time the piston is between 60 degrees and 30 degrees before top dead center, and an ignitable mixture cloud formed in the swirl core is held in the area of the ignition device while the piston approaches top dead center.

2. Combustion process as claimed in claim 1, wherein the injector nozzle is a multihole nozzle having a stream cone angle of the spray cone of 40°–55°.

3. Combustion process as claimed in claim 1, wherein the injector nozzle is a swirl injector having a stream cone angle of the spray cone of 60°–80°.

4. Combustion process as claimed in claim 2, wherein the recess has essentially parallel side walls extending between an intake side end of the recess and the recess border, the recess border is curved to meet the side walls, the bottom of the recess rises in at least some sections up to a piston edge on the intake side, and the recess bottom is connected to the side walls and the recess border via rounded sections with radii of 5–20 mm.

5. Combustion process as claimed in claim 3, wherein the recess has essentially parallel side walls extending between an intake side end of the recess and the recess border, the recess border is curved to meet the side walls, the bottom of the recess rises in at least some sections up to a piston edge on the intake side, and the recess bottom is connected to the side walls and the recess border via rounded sections with radii of 5–20 mm.

6. Combustion process as claimed in claim 4, wherein each of the intake channels is a filling channel, whereby at least one of the filling channels can be closed in a controlled manner in partial load operation by a flow control element that closes the channel cross section in a controlled manner.

7. Combustion process as claimed in claim 5, wherein each of the intake channels is a filling channel, whereby at least one of the filling channels can be closed in a controlled manner in partial load operation by a flow control element that closes the channel cross section in a controlled manner.

8. Combustion process as claimed in claim 6, wherein the filling channels are separate from one another up to the intake valves.

9. Combustion process as claimed in claim 7, wherein the filling channels are separate from one another up to the intake valves.

10. Combustion process according to claim 6, wherein an intake channel which is common to at least two intake valves branches upstream of the intake valves, and each branch is controlled by one of the at least two intake valves.

11. Combustion process according to claim 7, wherein an intake channel which is common to at least two intake valves branches upstream of the intake valves, and each branch is controlled by one of the at least two intake valves.

12. Combustion process with charge stratification for an internal combustion engine having direct injection and spark ignition, the engine having a cylinder, the cylinder having a roof-like border on a cylinder head end containing intake valves and at least one exhaust valve, and a piston, the piston having a piston head adapted to the roof-like border with a recess oriented to a side of the cylinder containing at least one of the intake valves, comprising the steps of:

introducing charging air during a stratified charge operation through one of at least two intake valve-controlled intake channels into the cylinder to create a swirl flow the vicinity of the recess;

introducing fuel into the swirl flow from an injector nozzle; and igniting the fuel with an ignition device located at a top center of the roof-like border, wherein the recess is essentially open at an intake side and has a recess border on a side opposite the intake side of up to 0.15 D high and up to 0.2 D from the center axis of the ignition device, where D is a cylinder diameter, the intake valve controlling the intake channel through which charging air is introduced is operated essentially unthrottled at least in stratified charge operation, the injector nozzle is a multihole nozzle having a stream cone angle of the spray cone of 40°–55° and the recess has essentially parallel side walls extending between an intake side end of the recess and the recess border, the recess border is curved to meet the side walls, the bottom of the recess rises in at least some sections up to a piston edge on the intake side, and the recess bottom is connected to the side walls and the recess border via rounded sections with radii of 5–20 mm, such that a tubular swirl core aligned with a center axis of the ignition device is formed from the swirl flow by the recess by the time the piston is between 60 degrees and 30 degrees before top dead center, and an ignitable mixture cloud formed in the swirl core is held in the area of the ignition device while the piston approaches top dead center.

13. Combustion process as claimed in claim 12, wherein each of the intake channels is a filling channel, whereby at least one of the filling channels can be closed in a controlled manner in partial load operation by a flow control element that closes the channel cross section in a controlled manner.

14. Combustion process as claimed in claim 13, wherein the filling channels are separate from one another up to the intake valves.

15. Combustion process according to claim 13, wherein an intake channel which is common to at least two intake valves branches upstream of the intake valves, and each branch is controlled by one of the at least two intake valves.

16. Combustion process with charge stratification for an internal combustion engine having direct injection and spark ignition, the engine having a cylinder, the cylinder having a roof-like border on a cylinder head end containing intake valves and at least one exhaust valve, and a piston, the piston having a piston head adapted to the roof-like border with a recess oriented to a side of the cylinder containing at least one of the intake valves, comprising the steps of:

introducing charging air during a stratified charge operation through one of at least two intake valve-controlled intake channels into the cylinder to create a swirl flow the vicinity of the recess;

introducing fuel into the swirl flow from an injector nozzle; and igniting the fuel with an ignition device located at a top center of the roof-like border, wherein the recess is essentially open at an intake side and has a recess border on a side opposite the intake side of up to 0.15 D high and up to 0.2 D from the center axis of the ignition device, where D is a cylinder diameter, the intake valve controlling the intake channel through which charging air is introduced is operated essentially unthrottled at least in stratified charge operation, the injector nozzle is a multihole nozzle having a stream cone angle of the spray cone of 60°–80° and the recess has essentially parallel side walls extending between an intake side end of the recess and the recess border, the recess border is curved to meet the side walls, the bottom of the recess rises in at least some sections up to a piston edge on the intake side, and the recess bottom is connected to the side walls and the recess border via rounded sections with radii of 5–20 mm, such that a tubular swirl core aligned with a center axis of the ignition device is formed from the swirl flow by the recess by the time the piston is between 60 degrees and 30 degrees before top, dead center, and an ignitable mixture cloud formed in the swirl core is held in the area of the ignition device while the piston approaches top dead center.

17. Combustion process as claimed in claim 16, wherein each of the intake channels is a filling channel, whereby at least one of the filling channels can be closed in a controlled manner in partial load operation by a flow control element that closes the channel cross section in a controlled manner.

18. Combustion process as claimed in claim 17, wherein the filling channels are separate from one another up to the intake valves.

19. Combustion process according to claim 17, wherein an intake channel which is common to at least two intake valves branches upstream of the intake valves, and each branch is controlled by one of the at least two intake valves.

20. Internal combustion engine having direct injection and spark ignition, comprising:

a cylinder, the cylinder having a roof-like border on a cylinder head end containing intake valves and at least one exhaust valve;

at least two intake valve-controlled intake channels into the cylinder;

a piston, the piston having a piston head adapted to the roof-like border with a recess oriented to a side of the cylinder containing at least one of the intake valves, wherein the recess is essentially open at an intake side and has a recess border on a side opposite the intake side of up to 0.15 D high and up to 0.2 D from the center axis of the ignition device, where D is a cylinder diameter;

an injector nozzle adapted to introduce fuel into the swirl flow; and an ignition device located at a top center of the roof-like border, wherein in stratified charge operation charging air is introduced into the cylinder through one of the at least two intake channels to create a swirl flow the vicinity of the recess and the intake valve controlling the intake channel through which charging air is introduced is operated essentially unthrottled, an injector nozzle located between the intake channels and a top of a cylinder wall delivers fuel in a spray cone in the direction of the ignition device, the spray cone having a stream axis inclined 0 and 30 degrees downward from a plane orthogonal to the cylinder axis, the injector nozzle being controllable as a function of load such that a substantial portion of the spray cone is introduced into the swirl core, and a tubular swirl core aligned with a center axis of the ignition device is formed from the swirl flow by the recess by the time the piston is between 60 degrees and 30 degrees before top dead center, and an ignitable mixture cloud formed in the swirl core is held in the area of the ignition device while the piston approaches top dead center.

21. Internal combustion engine having direct injection and spark ignition, comprising:

a cylinder, the cylinder having a roof-like border on a cylinder head end containing intake valves and at least one exhaust valve;

at least two intake valve-controlled intake channels into the cylinder;

a piston, the piston having a piston head adapted to the roof-like border with a recess oriented to a side of the cylinder containing at least one of the intake valves, wherein the recess is essentially open at an intake side and has a recess border on a side opposite the intake side of up to 0.15 D high and up to 0.2 D from the center axis of the ignition device, where D is a cylinder diameter;

an injector nozzle adapted to introduce fuel into the swirl flow; and an ignition device located at a top center of the roof-like border, wherein the injector nozzle is a swirl injector having a stream cone angle of the spray cone of 60°–80°, the recess has essentially parallel side walls extending between an intake side end of the recess and the recess border, the recess border is curved to meet the side walls, the bottom of the recess rises in at least some sections up to a piston edge on the intake side, and the recess bottom is connected to the side walls and the recess border via rounded sections with radii of 5–20 mm, in stratified charge operation charging air is introduced into the cylinder through one of the at least two intake channels to create a swirl flow the vicinity of the recess and the intake valve controlling the intake channel through which charging air is introduced is operated essentially unthrottled, and a tubular swirl core aligned with a center axis of the ignition device is formed from the swirl flow by the recess by the time the piston is between 60 degrees and 30 degrees before top dead center, and an ignitable mixture cloud formed in the swirl core is held in the area of the ignition device while the piston approaches top dead center.

22. The internal combustion engine as claimed in claim 21, wherein each of the intake channels is a filling channel, whereby at least one of the filling channels can be closed in a controlled manner in partial load operation by a flow control element that closes the channel cross section in a controlled manner.

23. The internal combustion engine as claimed in claim 22, wherein the filling channels are separate from one another up to the intake valves.

24. Combustion process according to claim 22, wherein an intake channel which is common to at least two intake valves branches upstream of the intake valves, and each branch is controlled by one of the at least two intake valves.

* * * * *